Dec. 10, 1968  A. CZARNECKI  3,415,201
POWER-AND-FREE CONVEYOR SYSTEM
Filed Jan. 10, 1966  3 Sheets-Sheet 3
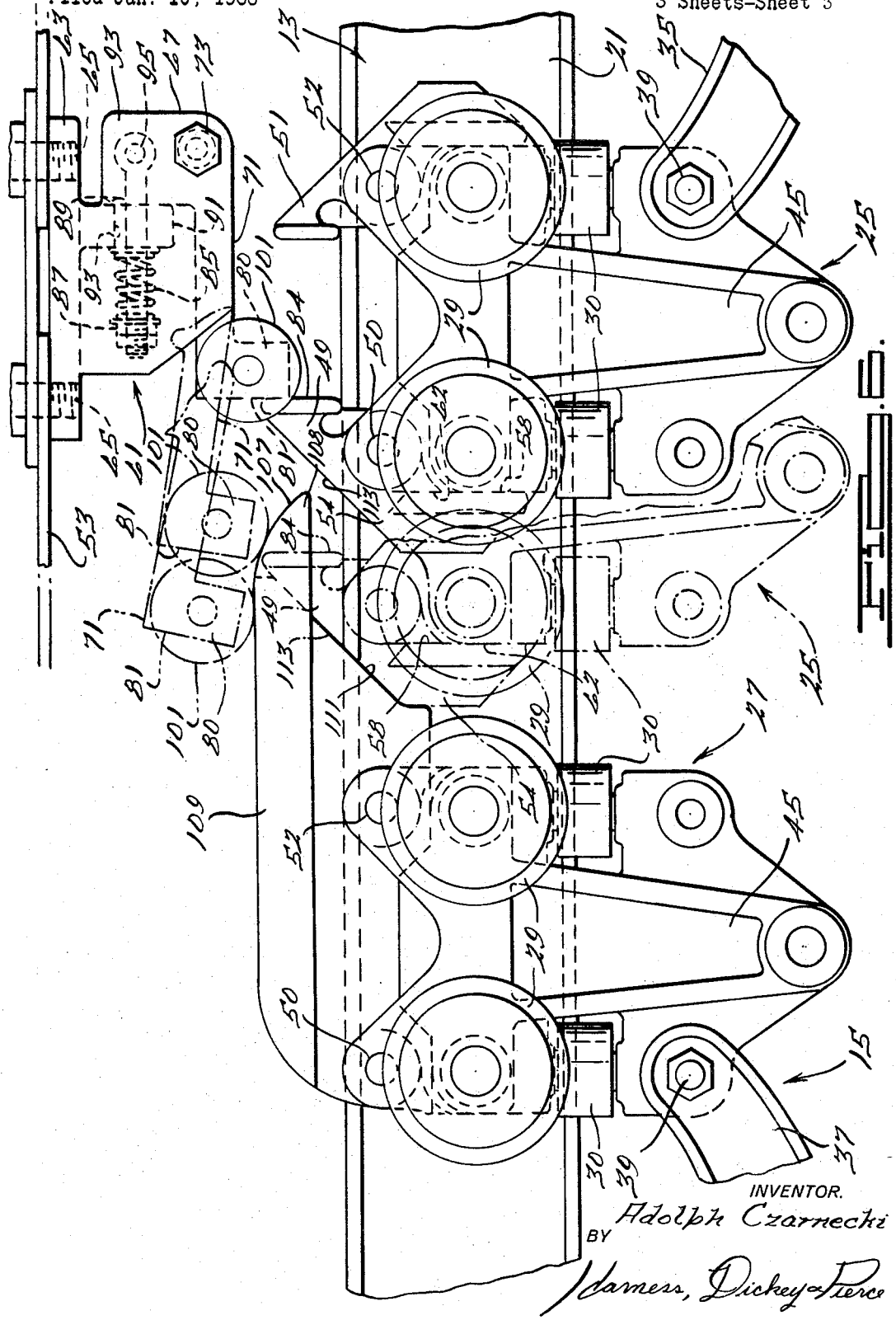
INVENTOR.
Adolph Czarnecki
BY
Harness, Dickey & Pierce
ATTORNEYS.

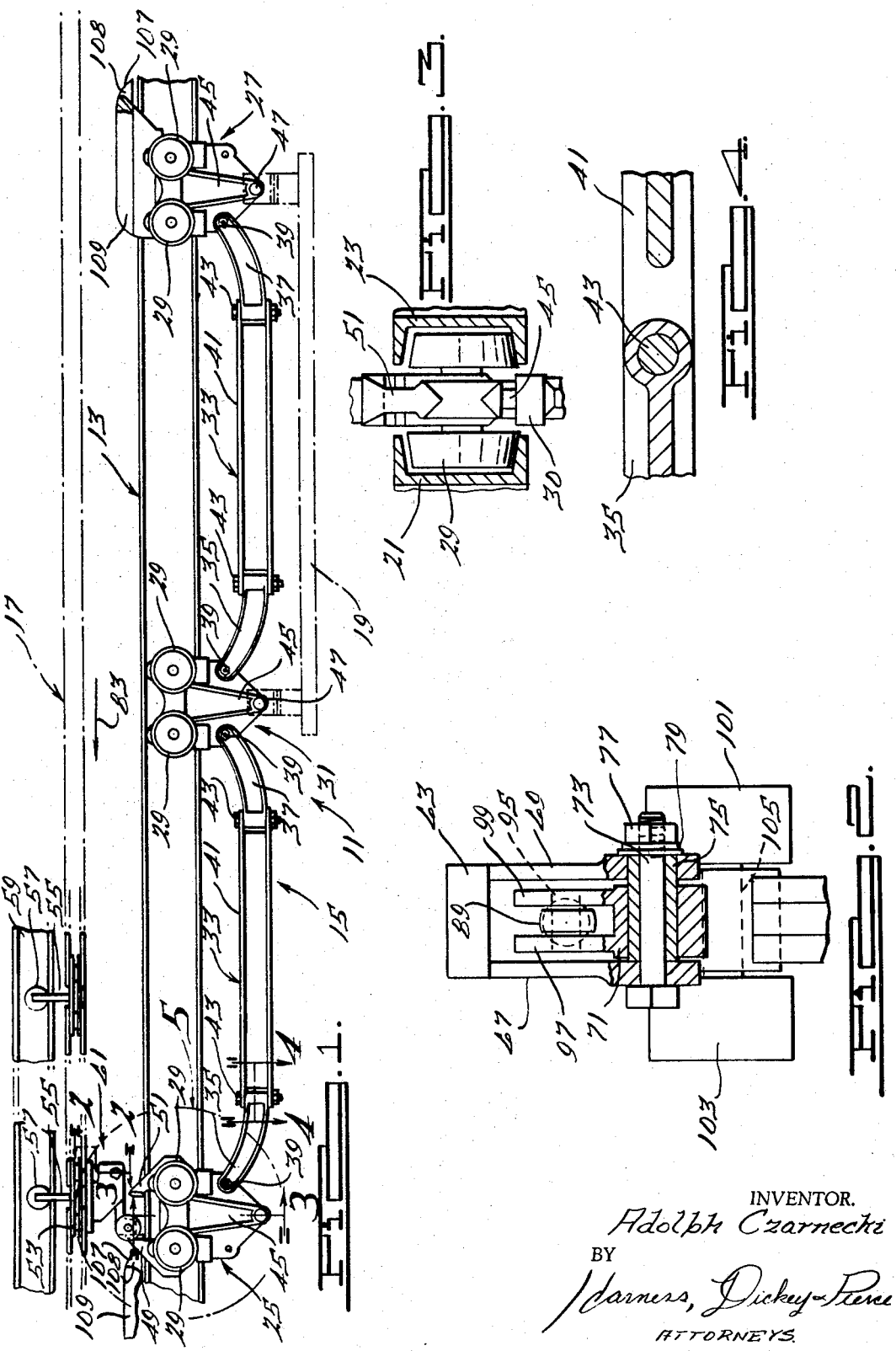

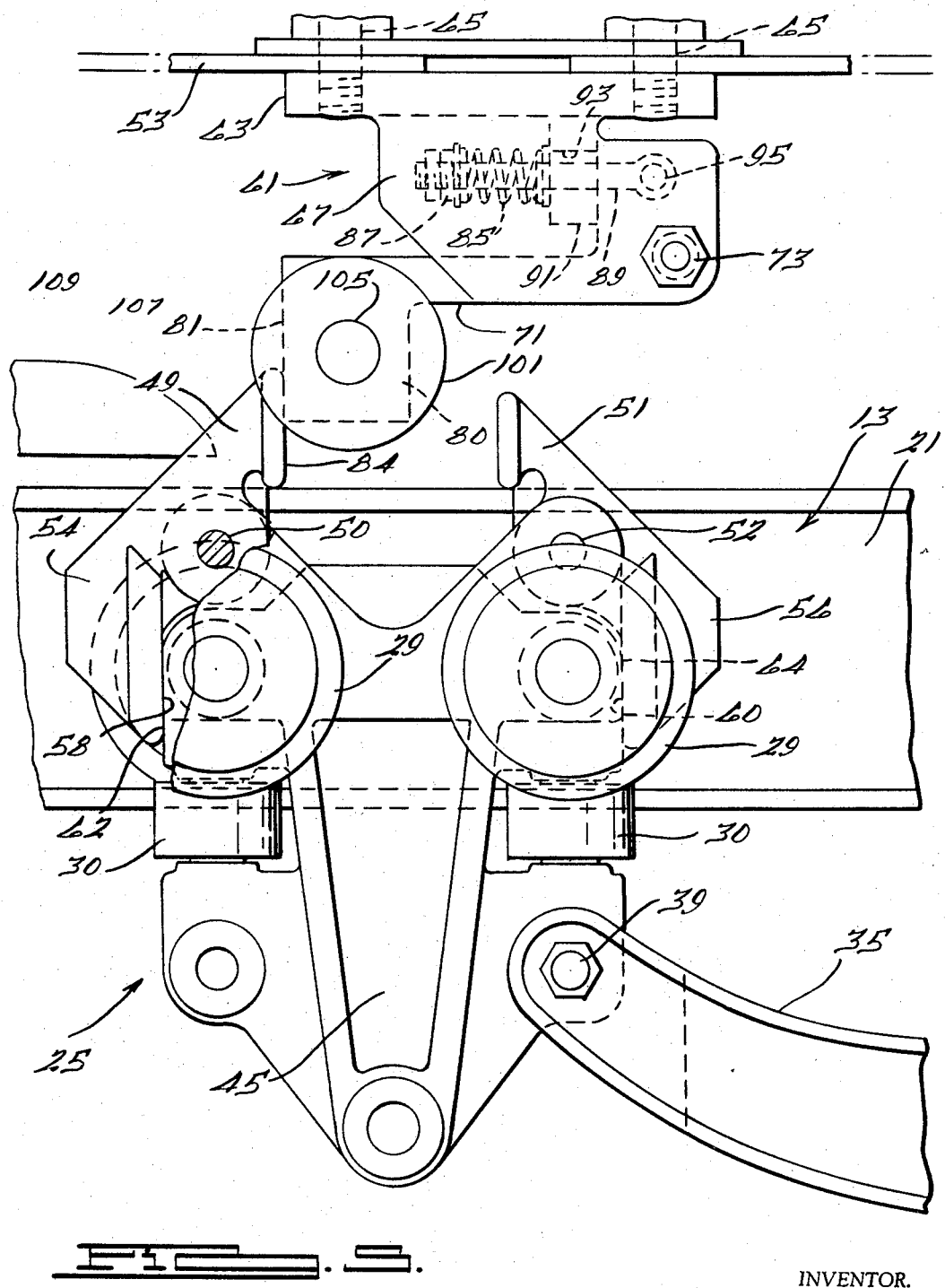

United States Patent Office 3,415,201
Patented Dec. 10, 1968

3,415,201
POWER-AND-FREE CONVEYOR SYSTEM
Adolph Czarnecki, Birmingham, Mich., assignor, by mesne assignments, to Standard Alliance Industries, Inc., Chicago, Ill., a corporation of Delaware
Filed Jan. 10, 1966, Ser. No. 519,797
15 Claims. (Cl. 104—178)

ABSTRACT OF THE DISCLOSURE

Specifically, the invention is embodied in a novel work carrier adapted for use in a power-and-free conveyor system and uniquely constructed to release a pivoted driving lug on the power chain of the conveyor for close packing of the carriers in selected sections of the system. To this end, each carrier comprises front and rear trolleys interconnected by articulated mechanical means. The two trolleys have identical bodies of a known and conventional construction. However, oppositely facing pivoted flop dogs are mounted on the front trolley body in the conventional manner and a cam plate is mounted on the rear trolley body. It is a special feature of the invention that the cam plate has a rearwardly extending portion provided with a rearwardly opening recess that is adapted to receive the front driven dog of a following work carrier and that is of sufficient size to entirely accommodate the dog so that a portion of the cam plate laterally of the recess engages and releases the driving lug which propels the following carrier as the driven dog of the latter moves into the recess and into nestling relation with the cam plate of the preceding carrier.

---

This invention relates generally to work conveyors, and particularly to an improved power-and-free conveyor system.

The term "power-and-free" refers generally to those conveyors having a plurality of trolley type work carriers movabe along an overhead track and from which workpieces are suspended. A power driven chain or the like is located adjacent the work carriers and is provided with spaced pusher members selectively engageable with and disengageable from the work carriers in a predetermined manner to effect the desired workpiece delivery along paths defined by the track.

In most plant installations, it is necessary that the workpieces be maintained in spaced relation during normal handling so that succeeding workpieces and/or work carriers from which the workpieces are suspended do not interfere with each other either in feeding through close quarters or around curves in the track or when it is desired to perform some operation on individual workpieces, such as, for example, painting. However, it is sometimes necessary to arrange these workpieces in close-packed or nesting relation in order to conserve plant space. Thus, for example, the required space or size of storage stations and/or workpiece drying or heat treating stations can be greatly reduced if the workpieces can be close-packed or nested thereat. At these stations, then, it is necessary to disengage the power chain pusher members and the work carriers so as to cause succeeding workpieces to move together in close-packed or nesting relation.

It has been proposed to use somewhat modified basic work carrier trolley assemblies to effect disengagement between the work carriers and the pusher members on the power chain at selected intervals. However, since in these systems the workpieces are suspended from the trolley assemblies, they are necessarily relatively large, detailed and therefore expensive devices and to employ modified ones thereof involves considerably higher costs to the user. Thus, a need exists for a power-and-free conveyor system adapted for handling workpieces in normally spaced relation but which effects workpiece close-packing or nesting using standard trolley assemblies. In addition, the system should be adapted, such as in the exemplary workpiece drying oven stations, to permit easy workpiece delivery therefrom to the normally spaced relation after the drying sequence is completed.

An important object of the present invention, therefore, is to provide a power-and-free conveyor system using standard work carrier trolley assemblies and adapted to normally handle workpieces in spaced relation and operable to provide nesting or close-packing of the workpieces.

A further object is to provide a conveyor system of the above character which is operable to permit return of the workpieces to the normally spaced relation handling and which is adapted for use in pre-existing conveyor installations.

Further objects include a conveyor of the above character which is relatively inexpensive to manufacture, simple but rugged in construction and reliable in use.

Other objects and advantages of the present invention will become more apparent from a consideration of the following detailed description taken in conjunction with the drawings in which:

FIGURE 1 is a side elevational view of a portion of a power-and-free conveyor system embodying the present invention;

FIG. 2 is an enlarged sectional view of FIG. 1 taken along the line 2—2 thereof;

FIG. 3 is an enlarged sectional view of FIG. 1 taken along the line 3—3 thereof;

FIG. 4 is an enlarged sectional view of FIG. 1 taken along the line 4—4 thereof;

FIG. 5 is an enlarged view of a portion of FIG. 1 taken within the circle 5 thereof and showing the conveyor parts in their normal relation; and FIG. 6 is a view similar to FIG. 5 showing the conveyor parts as they move to close-pack or nest the workpieces.

Broadly described, the present invention includes a power-and-free conveyor system having track means, work carriers comprising interconnected front and rear trolleys movable along said track means and adapted to support a workpiece, elongated drive means adjacent said track means, said power means having spaced pusher lug means engageable with said work carriers, the improvement comprising means mounting said pusher lug means for limited movement into and out of engagement with said work carriers, means normally holding said pusher lug means operatively positioned for engagement with said work carriers, said rear trolley having cam means disposed to nest with the front trolley of a following work carrier and operable during nesting to disengage the pusher lug means from said following carrier.

In addition, the present invention includes, as an article of manufacture, a work carrier comprising interconnected front and rear trolleys, said front trolley having a pivoted driving dog and said rear trolley having a ramp provided with rearwardly extending cam means arranged to overlap and nest with the driving dog of a following work carrier, said cam means having a top surface disposed at least at the same level as the top of said driving dog and a terminal portion below the top of said driving dog.

Referring now more particularly to the drawings, there is shown generally at 11 in FIG. 1 a portion of power-and-free conveyor system including an elongated track 13 having a work carrier 15 supported for movement therealong. Although not shown here, it is to be understood that additional substantially identical work carriers similarly supported on the track 13 are contemplated. A power chain 17 is positioned adjacent the track 13 and is constructed for operative driving engagement with the work carriers 15 to move them and the workpieces suspended therefrom along the track 13. A workpiece supporting platform is illustrated diagrammatically in dot-dash lines at 19 in FIG. 1.

As shown in FIG. 3, the track 13 may be formed by a spaced pair of opposed channel ways 21, 23 suitably suspended from overhead structure in a conventional manner such as is illustrated and described in copending application Ser. No. 382,780, filed July 15, 1964, and owned by the assignee of the present application. The work carriers 15 include at least a front and a rear interconnected trolley assembly 25, 27, each of which has a plurality of ball bearing wheels 29 which ride in the channel ways 21, 23 and lateral guide rollers 30 adapted to engage the lower edges of the channels 21, 23 should the trolley assemblies move laterally in the ways. In the device illustrated, a third trolley assembly 31 is positioned intermediate the front and rear trolley assemblies 25, 27 for additional workpiece support although it is to be understood that only two trolley assemblies are required and in some cases, four or more such assemblies may be necessary. The trolley assemblies 25, 27, if two are employed, or 25, 31, 27, if three are required, of each work carrier 15 are interconnected by tow bars 33 having end portions 35, 37 which are pivotally connected at each end to adjacent trolley assemblies by pins 39 and which have an intermediate portion 41 pivotally interconnected with the end portions 35, 37 by pins 43. The pins 39 permit pivotal movement about horizontal axes and the pins 43 about vertical axes to provide universal connections which permit the work carrier 15 to travel easily along inclined or curved portions of the track 13.

The trolley assemblies 25, 27, 31 are each basically of conventional construction, such as is illustrated and described in detail in the above-referred to copending application, and a description of one will suffice here. Thus, the trolley assembly 25 includes a downwardly depending body portion 45 upon which the wheels 29 are mounted for free rotation about horizontal axes. The workpiece platform 19 is fixed to two or more of the depending body portions 45 by bolts 47 or other suitable fastening means and is suspended therebelow.

According to the present invention, the front trolley assembly 25 of the work carrier 15 is adapted to be engaged and driven along the track 13 by driving lug means 61 carried by the power chain means 17. Thus, the trolley assembly 25 has a pair of upwardly projecting spaced dogs 49, 51 pivotally supported upon the body portion 45 by horizontal pivot pins 50, 52 for pivotal movement toward and away from each other. The dogs 49, 51 have lower ends 54, 56 weighted so that the dogs normally occupy the position illustrated in FIGS. 1 and 5, the lower ends 54, 56 having flat surfaces 58, 60 positioned to engage surfaces 62, 64 on the trolley body portion 45 to limit movement of the dogs 49, 51 away from each other. However, both dogs 49, 51 can pivot freely in a direction toward the other from the position illustrated as is conventional to receive one of the driving lug means 61 carried by the power chain 17 to move to a position between the dogs. By providing both dogs 49, 51 with pivotal mountings, the trolley assembly 25 can be driven in either direction along the track 13.

The power chain means 17 includes an endless chain 53 suspended from a plurality of carriers 55, each of which is provided with a pair of freely rotatable wheels 57 (only one of which is shown) adapted to ride along an I-beam 59 rigidly suspended from the same overhead structure (not shown) as the track 13 in a manner similar to that illustrated and described in the above-referred to copending application.

Fixed to and suspended from the chain 53 at suitably spaced locations therealong are novel pusher lug means 61. As shown in FIG. 1 and perhaps best in FIGS. 2 and 5, the lug means 61 includes a base frame 63 fixed to the chain 53 by screws 65 and a pair of spaced parallel plates 67, 69 depending downwardly from the base 63. A generally S-shaped arm 71 is pivotally secured between the plates 67, 69 by a bolt 73 extending through aligned openings in the plates 67, 69 and in the arm 71. If desired, a sleeve bushing 75 may be positioned in surrounding relation to the bolt 73 in endwise abutting engagement with the plate 67 and extending through the opening in the plate 69. A nut 77 is threaded on the end of the bolt 73 and holds washer means 79 in engagement with the end of the bushing 75 and the outer side of the plate 69. Thus, the bushing 75 and washer means 79 permit full tightening of the bolt 73 and nut 77 without binding the pivotal connection between the arm 71 and the plates 67, 69.

The forward end of the arm 71 has a downwardly depending lug 80 provided with a forwardly facing abutment surface 81 which, when the chain 53 is moved in the direction of the arrow 83 shown in FIG. 1, is adapted to engage a rearwardly facing abutment surface 84 on the dog 49 of the trolley assembly 25 and move the work carrier 15 in the same direction along the track 13.

The arm 71 is normally held in this position, shown in FIGS. 1 and 5 and in full lines in FIG. 6, by compression spring 85 having one end in engagement with a nut 87 threaded on an eye bolt 89 and its other end engaging a rib 91 depending from the lug means base 63 and between the plates 67, 69. The eye bolt 89 extends freely through an enlarged slot 93 in the rib 91 and is pivotally secured by a pin 95 between a pair of upstanding spaced parallel ears 97, 99 on the upper end of the arm 71. Thus, the spring 86 normally holds the arm 71 in the position illustrated in the figures but permits it to pivot about the axis of the bolt 73 in a manner illustrated in dot-dash and dot-dot-dash lines in FIG. 6 for a purpose to be described.

When the lug 80 is outside the dogs 49, 51, movement of the chain 53 in the direction of the arrow 83 causes the lug 80, and specifically the surface 81 thereon, to engage the rear end of the dog 51 causing it to pivot about the pin toward the dog 49 and allows the lug 80 to move between the dogs 49, 51 when the lug surface 81 drivingly engages the surface 84 on the dog 49, continued movement of the power chain 53 causes movement of the work carrier 15 and therefore the work supporting platform 19 in the same direction since the trolley devices 25, 31, 27 are interconnected by the tow bars 33. According to the present invention, only the front trolley device 25 is provided with the dogs 49, 51 so that only this trolley device is drivingly engaged by the lug means 61.

As described above, it is normally required that the work carriers 15 be conveyed along the track 13 in spaced relation and to achieve this, lug means 61 are provided at appropriately spaced positions along the drive chain 53. However, in a number of plant installations, it is desirable that in certain stations, the workpiece carriers be close-packed or in nested relation, such as, for example, at workpiece storage and drying oven stations as set out briefly above. To achieve this, it is necessary to disengage the lug means 61 and specifically the lug surface 81 on the arm 71 from the dog surface 84. According to the present invention, this is achieved by pivoting the arm 71 upwardly against the action of the spring 85 so that the lug surface 81 is raised above the dog surface 84 and the lug 80 is removed from between the dogs 49, 51.

To attain this pivotal action, the arm 71 is provided with at least one and preferably a pair of rollers 101, 103 mounted for free turning movement upon the lug 80 by a shaft 105. The bottom surfaces of the rollers 101, 103 are at or slightly below the bottom of the lug 80 and lug surface 81 and are positioned to engage and ride up aligned cam surfaces 107 on a bifurcated rear portion 108 of a ramp 109 fixed by the pins 50, 52 to the rear trolley assembly 27 of a preceding work carrier 15' shown partially in FIG. 6. The top of the cam surfaces 107 is positioned at or slightly above the top of the dog 49 so that when the rollers 101, 103 ride up the cam surfaces 107, as shown in dot-dash and dot-dot-dash lines, respectively, in FIG. 6, the arm 71 is pivoted upwardly about the bolt 73 and the abutment surface 81 on the lug 80 is lifted above the abutment surface 84 on the dog 49. The bifurcated rear end 108 of the ramp 109 extends slightly rearwardly beyond the rear trolley 27 and the ramp underside has a tapered surface 111 complementary to a forward end tapered surface 113 on the dog 49 of the front trolley 25. Thus, the lug means 61 is disengaged from the front trolley 25 before it collides with the ramp 109 on the rear trolley 27 of the preceding work carrier 15' so that the work carrier 15 can coast into nesting relation with the work carrier 15' as shown in dot-dash lines in FIG. 6. In this position, the dog 49 is received in nesting relation between the bifurcations 108 of the ramp 109 and the dog surface 113 engages the ramp surface 111.

With the front and rear trolley assemblies 25, 27 of each work carrier formed as shown, as many work carriers as desired can be nested or close-packed, with the lug means 61 for each succeeding work carrier being lifted from engagement with the dog 49 thereof by the dog rollers 101, 103 riding up the cam surfaces 107 of the bifurcated ramp end portion 108 of the preceding work carrier.

To initiate the close-packing or nesting sequence, it is necessary to provide some means for disengaging the lug means 61 from the dog 49 of the first work carrier 15. This can easily be achieved by providing a ramp means similar to the ramp 109 at the forward end of the station where the work carrier nesting sequence is to take place. This can easily be achieved by providing a ramp means track 13 on its supporting means if at a storage station, but preferably is selectively operable as by moving and/or lifting from a position below the track 13 to a position where it engages the rollers 101, 103 and lifts the arm 71 of the lug means 61 drivingly engaging the first work carrier 15 to be nested or close-packed. This selective operation could be effected manually or automatically, for example, in response to movement of the drive chain 53. If it be desired to deliver the workpiece from the close-packed or nesting station and reestablish the normally spaced relation thereof as in the case of the drying oven station referred to above, after the workpiece associated with the leading work carrier 15 has remained in the oven for the desired length of time, the selectively operable ramp (not shown) could be withdrawn and/or lowered from its operative position thereby allowing the dog 49 on the front trolley assembly 25 of this leading work carrier 15 to be engaged and moved out of the oven by one of the lug means 61. This, then, effects release of the next work carrier 15 for engagement by the next lug means 61 which in turn releases the next work carrier, and so on until all or as many of the work carriers as desired are moved out of the nesting or close-pack station. Of course, the selectively operable ramp (not shown) can be moved back into its operable position at any time to reestablish the nesting sequence. The structure and controls for achieving this particular selective movement has not been illustrated here as it is wholly within the realm of the skilled engineer and forms no part of the present invention.

What is claimed is:

1. In a power-and-free conveyor system of the type having a track, movable work carriers on said track, and an overhead power chain having spaced pusher lug means engageable with said work carriers to move the latter along said track, the improvement comprising
   means mounting said pusher lug means for limited movement into and out of engagement with said work carriers, and
   means normally holding said pusher lug means operatively positioned for engagement with said work carriers; and wherein each of said work carriers comprises interconnected front and rear trolleys, said rear trolley having cam means disposed to nest with the front trolley of a following work carrier and having a
   drive disengaging cam portion arranged to extend behind the part of said trolley engaged by said pusher lug means during nesting and engageable directly with said pusher lug means to disengage said pusher lug means from said following carrier.

2. The combination as set forth in claim 1 wherein said work carriers each has driving dog means engageable with said pusher lug means and wherein said pusher lug means is mounted for limited vertical movement into and out of engagement with said driving dog means.

3. The combination as set forth in claim 2 wherein vertical movement of said pusher lug means positions them into and out of engagement with said dog means and wherein said cam means includes ramp means provided with rearwardly extending bifurcations arranged to embrace the driving dog means on the front trolley of a following work carrier, said bifurcations having top cam surfaces engageable with a movable pusher lug means bearing on said driving dog means as the latter moves into embracing relation with said bifurcations to disengage said lug means from said dog means.

4. The combination as set forth in claim 3 wherein said movable pusher lug means has laterally spaced rollers thereon, and wherein said top cam surfaces have terminal portions disposed to engage said rollers during nesting of said ramp with said trolley dog means and operable thereby to disengage said lug means from the driving dog means.

5. The combination as set forth in claim 1 wherein said front and rear trolleys have substantially identical wheeled body portions mounted to travel on said track, at least one pivoted driving dog on the body portion of said front trolley disposed for engagement by one of said pusher lug means to drive said work carrier along said trackway; a ramp on the body portion of said rear trolley having rearwardly extending cam means adapted to nest or interfit with the front trolley of a following work carrier, said ramp and cam means being engageable during nesting with a pusher lug means bearing on the driving dog of said following trolley and operative by such engagement to disengage said lug means from said dog, whereby to close-pack said work carriers and to maintain said following work carrier effectively disengaged from said power chain.

6. The combination as set forth in claim 5 including tow bars interconnecting said front and rear trolleys holding said trolleys in rigidly spaced relation; and universal joints in said tow bars permitting articulation between the component parts of the work carrier during movement of the latter along curved or inclined portions of said track.

7. The combination as set forth in claim 2 wherein said pusher lug means each includes a pivoted arm having a depending lug engageable with said driving dog means.

8. The combination as set forth in claim 7 which includes spring means normally holding said arm in a position where said lug engages said driving dog means.

9. A work carrier for power-and-free conveyor systems comprising
   interconnected front and rear trolleys, said front trolley having
   a pivoted driving dog and said rear trolley having
   a ramp provided with
   rearwardly extending cam means formed with
   a rearwardly opening recess adapted to receive and nest with the driven dog of a following work carrier, and
   a cam portion laterally of the recess adapted to extend behind the nested driven dog and operative to disengage a pusher lug from said dog as the latter moves into nesting relation with said cam means,
   said cam means having a top surface disposed at least at the same level as the top of said driving dog and a terminal portion below the top of said driving dog.

10. The combination as set forth in claim 9 wherein said ramp is provided with rearwardly extending bifurcations arranged to embrace and nest with the driving dog on the front trolley of a following work carrier and wherein said cam means is formed on said bifurcations.

11. The combination as set forth in claim 9 wherein said front and rear trolleys have substantially identical wheeled body portions, articulated tow bars for holding said front and rear trolleys in rigidly spaced relation, said ramp on said rear trolley having a formed rear portion substantially complementing the forward contour of said front trolley and wherein said cam means is disposed laterally of and extends rearwardly from said formed rear portion.

12. The combination as set forth in claim 9 wherein said ramp and cam means is operative during nesting to disengage a pusher lug from the driving dog of said following work carrier.

13. The combination as set forth in claim 4 wherein said rollers extend below said pusher lug means, and
wherein the distance between the bottoms of said rollers and said top cam surfaces is at least as great as the distance between the bottom of said pusher lug means when engaged with said driving dog means and the top of the latter.

14. The combination as set forth in claim 1 wherein said front and rear trolleys have substantially identical wheeled body portions mounted to travel on said track and provided with
spaced front and rear mounting portions, oppositely facing
front and rear dogs pivotally connected to the mounting portions of said front trolley, said front dog disposed for engagement by one of said pusher lug means to drive said work carrier along said trackway and the rear dog disposed to engage said pusher lug means to prevent overtravel of said work carrier with respect to said pusher lug means, and wherein the
cam means on said rear trolley is connected to the mounting portions of the latter and is provided with a
rearwardly opening recess adapted to receive and nest the front trolley of a following work carrier, said cam means also being provided with
a ramp portion disposed laterally of said recess and operative to disengage a pusher lug from the driving dog of said following trolley as the dog enters said recess and nests with said cam means.

15. A work carrier for power-and-free conveyor systems comprising
interconnected front and rear trolleys said front trolley having a
pivoted driving dog and said rear trolley having a horizontal ramp provided with a
rearwardly extending portion formed with a
rearwardly opening recess adapted to receive and nest with the driving dog of a following work carrier, said rearwardly extending portion laterally of said recess adapted to extend behind the nested driving dog and defining
cam means, the top surface of said cam means being related to the top of said driving dog such that said cam means is operative to disengage a pusher lug from said dog as the latter moves into nesting relation with said ramp.

References Cited

UNITED STATES PATENTS

| | | | |
|---|---|---|---|
| 3,195,473 | 7/1965 | Dehne | 104—172 |
| 3,314,378 | 4/1967 | Potter | 104—96 |

FOREIGN PATENTS 721,529  11/1965  Canada.

ARTHUR L. LA POINT, *Primary Examiner.*

D. F. WORTH, *Assistant Examiner.*

U.S. Cl. X.R.

104—172